US012009690B2

United States Patent
Li et al.

(10) Patent No.: US 12,009,690 B2
(45) Date of Patent: Jun. 11, 2024

(54) POWER CONVERTERS AND METHODS OF CONTROLLING SAME

(71) Applicant: Nextracker LLC, Fremont, CA (US)

(72) Inventors: Chen Li, Fremont, CA (US); Yang Liu, Mountain View, CA (US); Mohammed Salmaan Khan, San Jose, CA (US); Jonathan Kenzo Kamei, Dublin, CA (US); Sandeep Sanjiva Lele, Sunnyvale, CA (US)

(73) Assignee: NEXTRACKER LLC, Fremont, CA (US)

( * ) Notice: Subject to any disclaimer, the term of this patent is extended or adjusted under 35 U.S.C. 154(b) by 0 days.

(21) Appl. No.: 18/344,725

(22) Filed: Jun. 29, 2023

(65) Prior Publication Data

US 2023/0344266 A1    Oct. 26, 2023

Related U.S. Application Data

(63) Continuation of application No. 17/437,037, filed as application No. PCT/US2020/019749 on Feb. 25, (Continued)

(51) Int. Cl.
*H02M 3/158* (2006.01)
*G05F 1/56* (2006.01)
(Continued)

(52) U.S. Cl.
CPC ............. *H02J 7/35* (2013.01); *H02M 3/1582* (2013.01); *H02S 20/32* (2014.12); *G05F 1/56* (2013.01);
(Continued)

(58) Field of Classification Search
CPC ... G05F 1/56; G05F 1/59; G05F 1/595; G05F 1/70; H02M 1/088; H02M 3/06; H02M 3/158
See application file for complete search history.

(56) References Cited

U.S. PATENT DOCUMENTS 6,353,547 B1    3/2002  Jang et al.
8,184,460 B2    5/2012  O'Brien et al.
(Continued)

FOREIGN PATENT DOCUMENTS

| CN | 102148566 A | 8/2011 |
|---|---|---|
| EP | 3179622 A1 | 6/2017 |
| JP | 2013005649 A | 1/2013 |

OTHER PUBLICATIONS

Van Den Broeck Giel et al. "Analysis of three-level converters with voltage balancing capability in bipolar DC distribution networks", 2017 IEEE Second International Conference on DC Microgrids (ICDCM), IEEE, Jun. 27, 2017 (Jun. 27, 2017), pp. 248-255.
(Continued)

*Primary Examiner* — Gary A Nash
(74) *Attorney, Agent, or Firm* — Fredrikson & Byron, P.A.

(57) ABSTRACT

A power converter converts a medium-voltage output from a solar module to an appropriate voltage to power a solar tracker system. The power converter includes a voltage divider having at least two legs, a first semiconductor switch subassembly coupled in parallel with a first leg of the voltage divider, and a second semiconductor switch subassembly coupled in parallel with a second leg of the voltage divider. The power converter may be a unidirectional or a bidirectional power converter. In implementations, the signals for driving the semiconductor switches of the first and second semiconductor switch subassemblies may be shifted out of phase from each other. In implementations, if the bus voltages to the semiconductor switches are not balanced, the pulse width of the driving signal of the semiconductor switch supplied with the higher bus voltage is decreased for at least one cycle.

16 Claims, 12 Drawing Sheets

Related U.S. Application Data 2020, now Pat. No. 11,722,000, which is a continuation of application No. 16/284,807, filed on Feb. 25, 2019, now Pat. No. 10,651,739.

(51) Int. Cl.

| | | |
|---|---|---|
| *G05F 1/59* | (2006.01) | |
| *G05F 1/595* | (2006.01) | |
| *H02J 7/35* | (2006.01) | |
| *H02M 1/088* | (2006.01) | |
| *H02M 3/06* | (2006.01) | |
| *H02S 20/32* | (2014.01) | |
| *G05F 1/70* | (2006.01) | |
| *H02M 1/00* | (2006.01) | |
| *H02M 3/00* | (2006.01) | |
| *H02M 3/335* | (2006.01) | |
| *H02P 27/08* | (2006.01) | |
| *H02S 40/32* | (2014.01) | |
| *H02S 40/38* | (2014.01) | |

(52) U.S. Cl.
CPC .............. *G05F 1/59* (2013.01); *G05F 1/595* (2013.01); *G05F 1/70* (2013.01); *H02M 1/0043* (2021.05); *H02M 1/088* (2013.01); *H02M 3/01* (2021.05); *H02M 3/06* (2013.01); *H02M 3/158* (2013.01); *H02M 3/33571* (2021.05); *H02P 27/08* (2013.01); *H02S 40/32* (2014.12); *H02S 40/38* (2014.12)

(56) References Cited

U.S. PATENT DOCUMENTS

| | | | |
|---|---|---|---|
| 8,259,477 B2 | 9/2012 | Jin et al. | |
| 10,199,947 B2 | 2/2019 | Ye et al. | |
| 10,651,739 B1 | 5/2020 | Li et al. | |
| 2008/0192521 A1* | 8/2008 | Lacombe | H02M 1/34 363/124 |
| 2011/0074377 A1 | 3/2011 | Ooga | |
| 2014/0112025 A1* | 4/2014 | Mueller | H02M 3/33573 363/17 |
| 2014/0307489 A1* | 10/2014 | Kidera | H02M 7/493 363/40 |
| 2015/0244268 A1 | 8/2015 | Meinecke et al. | |
| 2016/0094153 A1* | 3/2016 | Li | H02M 7/487 363/123 |
| 2016/0172976 A1 | 6/2016 | Mu et al. | |
| 2017/0201177 A1* | 7/2017 | Kesarwani | H02M 1/14 |

OTHER PUBLICATIONS

Sato Hayato et al. "DPP Converter Using LLC Resonant Voltage Multiplier with a Voltage Divider for Curved Solar Roof of PREVs", 2018 IEEE 18th International Power Electronics and Motion Control Conference (PEMC), IEEE, Aug. 26, 2018, pp. 101-108.
PCT Search report and Written Opinion issued in PCT/US2020/019749 dated Jul. 14, 2020.
First Examination Report issued in Indian Patent Application No. 202127042714 dated May 4, 2022.
Partial European search report issued in European Patent Application No. 20762659.9 dated Oct. 24, 2022, 18 pages.
Extended European Search Report issued in European Application No. 20762659.9 dated Jan. 24, 2023.
Notice of Acceptance issued in Australian Patent Application No. 2020227736 dated Mar. 28, 2023.
Examination Report No. 1 issued in Australian Patent Application No. 2020227736 dated May 16, 2022.
Lee Minbok et al., "A 500-MHz, 0.76-W/mm2 Power Density and 76.2% Power Efficiency, Fully Integrated Digital Buck Converter in 65-nm CMOS", IEEE Transactions on Industry Applications, vol. 52m No. 4, Jul. 1, 2016, pp. 3315-3323.

\* cited by examiner

POWER CONVERTERS AND METHODS OF CONTROLLING SAME

RELATED APPLICATIONS

This application is a continuation of and claims priority to, U.S. patent application Ser. No. 17/437,037, filed on Sep. 7, 2021, which is a 371 of International Application number PCT/US2020/019749, filed on Feb. 25, 2020, which is a continuation of U.S. patent application Ser. No. 16/284,807 filed on Feb. 25, 2019, now U.S. patent Ser. No. 10/651,739, issued on May 12, 2020, the entire contents of which are incorporated herein by reference.

TECHNICAL FIELD

This disclosure relates generally to power converters for solar panels and methods of controlling the power converters. More particularly, this disclosure is directed to cost-effective medium-voltage power converters for solar trackers and methods for controlling the power converters to ensure proper operation of the power converter.

DESCRIPTION OF RELATED ART

Solar panels are used in a variety of applications to provide power to a load without needing to connect to a utility power grid. In the solar tracker scenario, and particularly in the self-powered solar tracker scenario, a solar module is used to power a control system and an electric motor of a solar tracker, which rotates a solar panel so that the solar panel follows the sun to ensure that the solar panel is positioned for maximum energy production. A single, relatively small panel is often sufficient to power the solar tracker, which may require about 15 W per day (generally between about 10 W and 25 W per day).

In some cases, the solar modules may not be able to generate electricity at their full potential because of the environmental conditions or the sun is at an angle that is not optimum for the solar cells to receive solar energy. A battery may be used to store the electricity generated by the solar modules, but the battery may not be able to provide sufficient power to the solar tracker because the battery may not be fully charged or the battery may fail for a variety of reasons. The solar modules for powering the solar tracker system may also add to the complexity and size of the solar tracker system.

SUMMARY OF THE INVENTION

This disclosure is directed to a power converter system that converts a portion of the power generated by the solar panels to an appropriate power signal for the solar tracker, thereby eliminating the need for a separate solar module.

In one general aspect, this disclosure features a medium-voltage power converter. The medium-voltage power converter includes a voltage divider having at least two legs. The medium-voltage power converter also includes a first circuit subassembly. The first circuit subassembly includes a first semiconductor switch and a first semiconductor device coupled together in series. The first circuit subassembly and a first leg of the at least two legs are coupled together in parallel. The medium-voltage power converter also includes a second circuit subassembly. The second circuit subassembly includes a second semiconductor switch and a second semiconductor device coupled together in series. The second circuit subassembly and a second leg of the at least two legs are coupled together in parallel. The medium-voltage power converter also includes a first inductor having a first end and a second end. The first end is coupled between the first semiconductor switch and the first semiconductor device. The second end is coupled to a first output terminal. The medium-voltage power converter also includes a second inductor having a first end and a second end. The first end is coupled between the second semiconductor switch and the second semiconductor device. The second end of the second inductor is coupled to a second output terminal.

Implementations may include one or more of the following features. Each of the at least two legs of the voltage divider may include a resistor and a capacitor coupled together in parallel. The medium-voltage power converter may include a controller configured to generate a first pulsed signal for controlling the first semiconductor switch and a second pulsed signal for controlling the second semiconductor switch. The first pulsed signal may be out of phase from the second pulsed signal. The first and second semiconductor devices may be diodes or semiconductor switches. The first pulsed signal may be 180 degrees out of phase from the second pulsed signal. The medium-voltage power converter may include a third circuit subassembly. The third circuit subassembly includes a third semiconductor switch and a third semiconductor device coupled together in series. The third circuit subassembly and a third leg of the at least two legs may be coupled together in parallel. The third semiconductor device may be a diode or a semiconductor switch. The first, second, and third semiconductor switches may be metal-oxide-semiconductor field-effect transistors (MOSFETs) or insulated-gate bipolar transistors (IGBTs).

In another general aspect, this disclosure features a method of operating a medium-voltage power converter. The method of operating the medium-voltage power converter includes synchronizing phases of drive signals applied to respective semiconductor switches coupled in parallel with respective legs of a voltage divider. The method of operating the medium-voltage power converter also includes measuring a solar panel voltage and measuring an output voltage of the medium-voltage power converter. The method of operating the medium-voltage power converter also includes determining whether the solar panel voltage is greater than twice the output voltage. The method of operating the medium-voltage power converter also includes in response to determining that the solar panel voltage is greater than twice the output voltage, shifting a phase of at least one of the drive signals so that the drive signals are out of phase from each other. Other aspects include corresponding computer systems, apparatuses, and/or computer programs recorded on one or more computer storage devices, each configured to perform the actions of the methods.

Implementations may include one or more of the following features. Shifting the phases of the at least one of the drive signals may include shifting the phases of at least one of the drive signals so that the drive signals are out of phase from each other by 180 degrees. The drive signals may be pulse-width modulation (PWM) drive signals.

In still another general aspect, this disclosure features a method of operating a medium-voltage power converter. The method of operating the medium-voltage power converter includes measuring a first voltage supplied to a first semiconductor switch coupled in parallel with a first leg of a voltage divider. The method of operating the medium-voltage power converter also includes measuring a second voltage supplied to a second semiconductor switch coupled in parallel with a second leg of the voltage divider; comparing the first voltage with the second voltage; and, if the first voltage is greater than the second voltage, decreasing a duty cycle of a drive signal applied to the second semiconductor switch in a next cycle. The method of operating the medium-voltage power converter also includes if the second voltage is greater than the first voltage, decreasing a duty cycle of a drive signal applied to the first semiconductor switch in a next cycle. Other aspects include corresponding computer systems, apparatuses, and/or computer programs recorded on one or more computer storage devices, each configured to perform the actions of the methods.

Implementations may include one or more of the following features. Comparing the first voltage with the second voltage may include determining whether the first voltage is greater than the second voltage plus a predetermined voltage and determining whether the second voltage is greater than the first voltage plus the predetermined voltage. Decreasing the duty cycle of a drive signal may include decreasing the duty cycle of a drive signal to zero in a next cycle. The method of operating the medium-voltage power converter may include generating a drive signal applied to the first semiconductor switch and a drive signal applied to the second semiconductor switch so that the drive signals are out of phase from each other. The drive signals may be 180 degrees out of phase from each other. The drive signals may be pulse-width modulation (PWM) drive signals. The duty cycle of the drive signal may be decreased by a predetermined amount that brings the first voltage and the second voltage closer to each other.

In still another general aspect, this disclosure features a medium-voltage power converter. The medium-voltage power converter includes a voltage divider having at least two legs. The medium-voltage power converter also includes a first circuit subassembly. The first circuit subassembly includes a first semiconductor switch and a first semiconductor device coupled together in series. The first circuit subassembly and a first leg of the at least two legs are coupled together in parallel. The medium-voltage power converter also includes a second circuit subassembly. The second circuit subassembly includes a second semiconductor switch and a second semiconductor device coupled together in series. The second circuit subassembly and a second leg of the at least two legs are coupled together in parallel. The medium-voltage power converter also includes a transformer coupled to the first and second circuit subassemblies, an inductor coupled between the first circuit subassembly and a primary side of the transformer, and a capacitor coupled between the second circuit subassembly and the primary side of the transformer.

Implementations may include one or more of the following features. The medium-voltage power converter may include a first semiconductor device coupled to a first secondary side of the transformer and a second semiconductor device coupled to a second secondary side of the transformer. The medium-voltage power converter may include a controller that generates a first pulsed signal for controlling the first semiconductor switch and a second pulsed signal for controlling the second semiconductor switch. The first pulsed signal may be out of phase from the second pulsed signal.

BRIEF DESCRIPTION OF DRAWINGS

Various aspects of the disclosure are described herein below with reference to the drawings, which are incorporated in and constitute a part of this specification, wherein.

DETAILED DESCRIPTION

This disclosure is directed to systems and methods for solar tracker control. Though described generally herein in the context of a solar tracking apparatus that utilizes both a photovoltaic (solar) panel and a battery to provide energy to drive a motor that rotates the tracker assembly, the systems, schematics, and algorithms described herein in any situation where there is solar energy being converted to electrical energy. For example, the systems and algorithms of the disclosure are useful where there is a solar tracker having a portion of its surface area shaded. A further context for the disclosure is in the area of a solar farm which is connected to a large power grid and may be associated with large battery banks that can be used to provide power to the grid when the solar panels are unable to meet demand. The solar farm may incorporate an energy storage container platform and a controller and system for connecting an energy storage container platform, which may include a battery, and a photovoltaic system to an energy grid.

Figure 1:
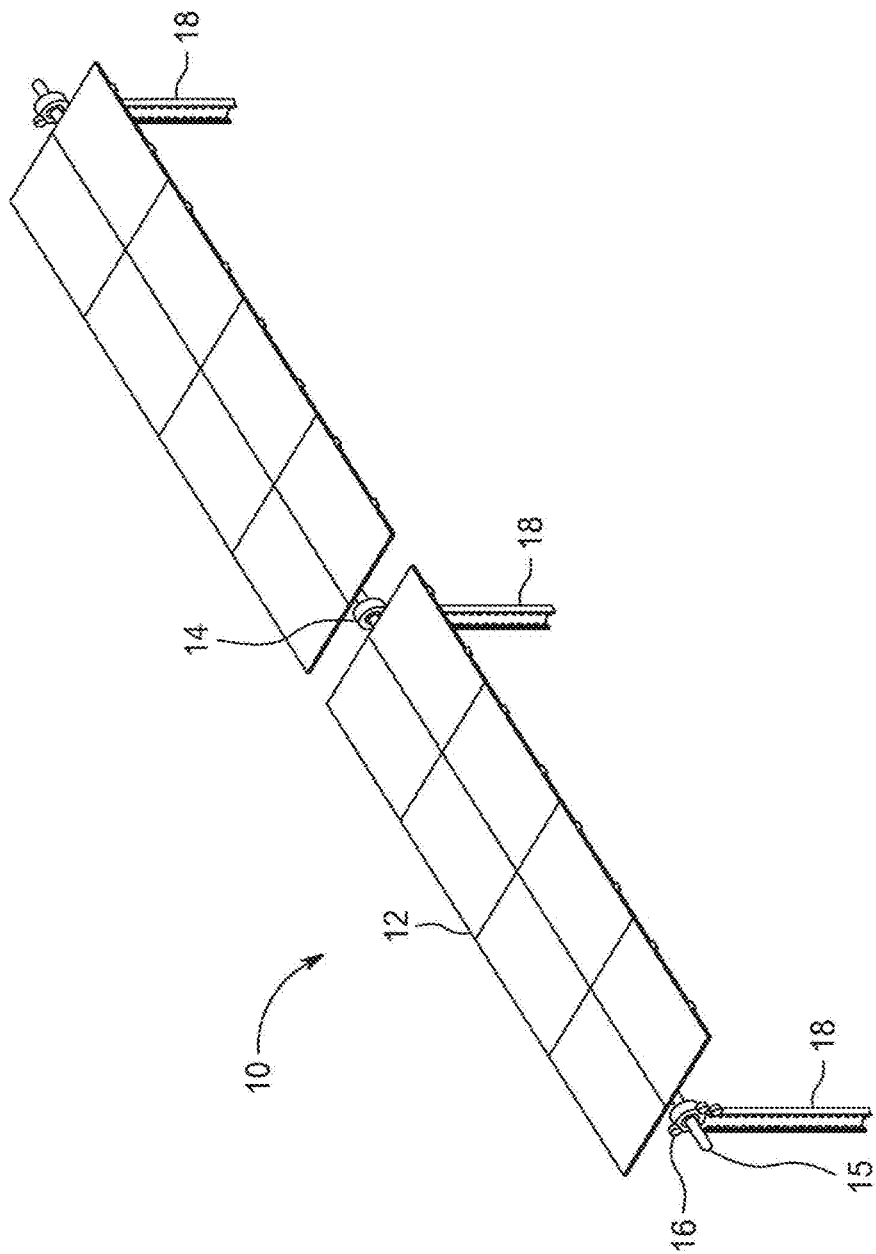
FIG. 1 depicts a solar tracker system in accordance with the disclosure.

FIG. 1 depicts a solar tracker system 10 which is commonly deployed as part of a larger array. Each solar tracker system 10 includes multiple photovoltaic (PV) solar panels 12. A motor 14 drives a shaft 15, to which the solar panels 12 are affixed. By driving the shaft 15, the solar panels 12 are maintained at a proper angle to the sun to ensure maximum electrical power generation. The shaft 15 is suspended between the motor 14 and a swinging or rotating mount 16. Both the motor 14 and the rotating mounts 16 are supported on posts 18.

The solar tracker system is located in proximity to the motor 14 and supported by the shaft 15. Either suspended from the underside of the shaft 15 or mounted to the post 18 is a box (not shown). The box 22 houses a battery 24, for example, and a controller 26. The controller 26 provides input to the motor 14 regarding whether to drive and how far to drive the shaft 15 to cause the solar panels 12 to track the movement of the sun.

Figure 2:
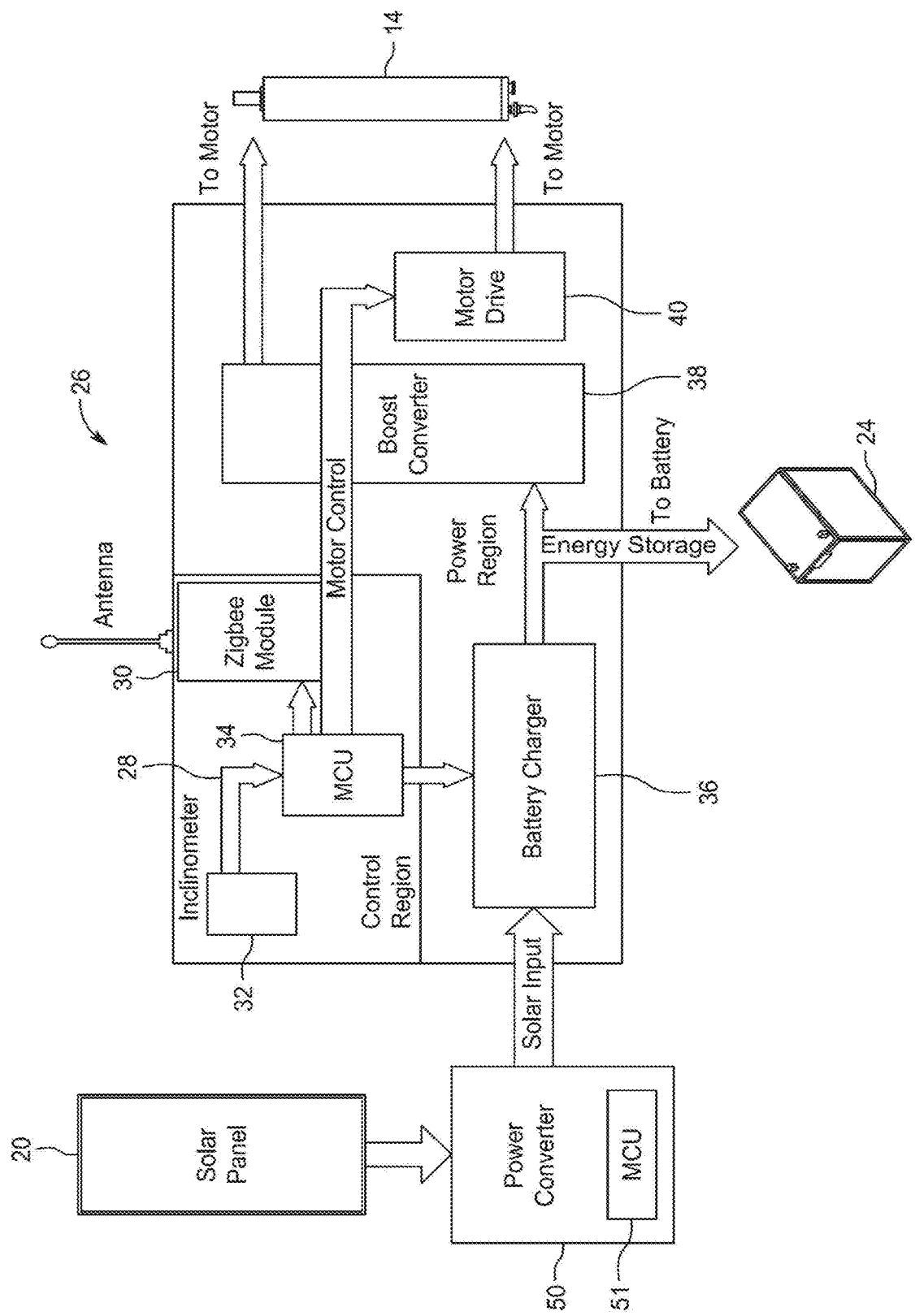
FIG. 2 depicts a schematic diagram of a solar tracker system connected to a photovoltaic string via a power converter in accordance with the disclosure.

FIG. 2 depicts a schematic diagram of a solar tracker system connected to a PV string 20 via a power converter 50 in accordance with the disclosure. In a larger PV array, individual solar panels 12 of FIG. 1, are connected in series (e.g., the positive terminal of one solar panel is connected to the negative terminal of another solar panel). This series connection of solar panels 12 is called a PV string 20. Power is communicated electrically from each of the PV strings 20 individually to the controller 26. Thus, individual currents of each of the PV strings 20 can be monitored. For example, this monitoring may also be used for over-current protection, for solar panel maintenance, for a tracking algorithm to increase PV plant yield, and/or for detection of south-north shading in addition to east-west shading. The controller 26 may then output the sum of the power as a single pair of DC cables to an inverter or to next level combining.

The controller 26 includes a control region 28 which houses a communications module 30 (e.g., ZigBee®, Wi-fi, Bluetooth®, etc.), an inclinometer 32, and a microcontroller unit (MCU) 34. The MCU 34 communicates with a power supply or battery charger 36, which provides power to the controller 26, and with a motor drive controller 40, which controls the driving of the motor 14. The MCU 34 includes at least one processor and at least one memory. The power converter includes a microcontroller unit (MCU) 51, which also includes at least one processor and at least one memory, which store programs or instructions including aspects of the control algorithms for driving the semiconductor switches or switching devices of the power converter 50 of this disclosure.

As depicted in FIG. 2, the PV strings 20 provide electricity to the power supply or battery charger 36 via a power converter 50 according to implementations described in the disclosure. The MCU 34 directs the flow of electricity from the PV strings 20 to the battery 24, e.g., a lithium ion (Li-ion) battery, for charging, to a boost converter 38, which supplies power to drive the motor 14, and/or to an inverter. The MCU 34 can also determine, based on the input from the PV strings 20, whether the energy being supplied is insufficient to drive the motor 14, and can cause the stored energy in the battery 24 to be utilized for this purpose. The power from each of the PV strings 20 is detected by a current sensing circuit 44. The current sensing circuit 44 measures the individual currents of each PV string 20. This measured current is fed into the MCU 34 which can run a tracker control algorithm for optimizing the power created by the solar tracker system 10.

Figure 3A:
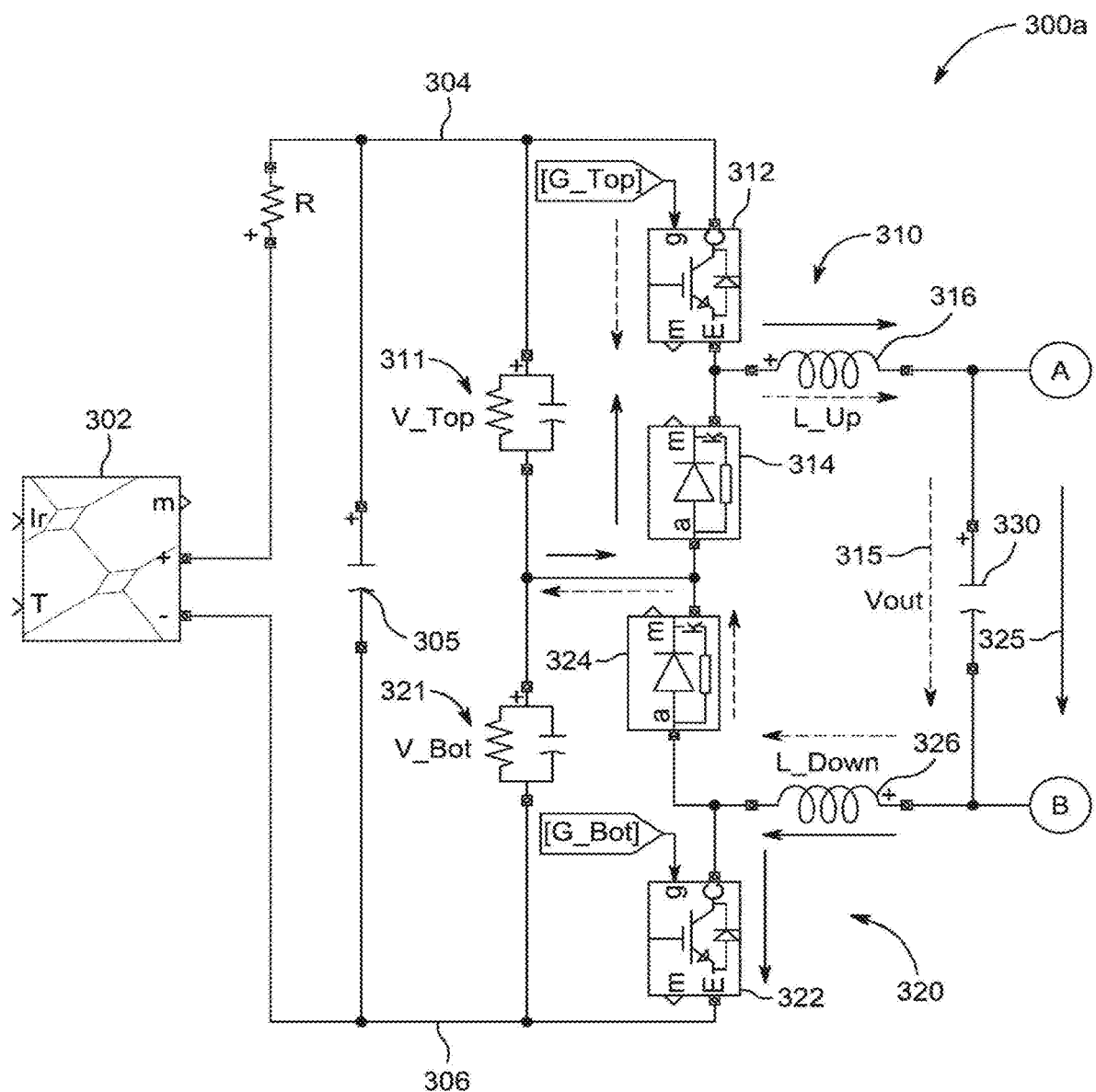
FIG. 3A depicts a circuit diagram of a unidirectional power converter topology in accordance with an aspect of the disclosure.

FIGS. 3A-3D depict circuit diagrams of power converter topologies in accordance with aspects of the disclosure. As shown in FIG. 3A, the unidirectional power converter subassembly 300a is connected to the positive and negative terminals of a solar panel, photovoltaic (PV) string 302, or an array or string of solar panels, e.g., the string of solar panels 12 illustrated in FIG. 1. The power converter topology includes buck/boost converters 310, 320 in a cascaded configuration so that each of the buck/boost converters 310, 320 take half of the DC input voltage supplied by the solar panel or PV string 302. For example, if the PV string 302 has a 1600 V maximum open circuit voltage, each of the cascaded buck/boost converters 310, 320 takes half of the DC voltage (e.g., 800 V maximum at this point), so that higher efficiency and more commercially available 1200 V semiconductor devices can be used in the buck/boost converters 310, 320.

In other implementations, the power converter topology may incorporate additional buck/boost converters in a cascaded arrangement with the buck/boost converters 310, 320 so that even lower voltage semiconductors may be used in the cascaded buck/boost converters, e.g., metal-oxide-semiconductor field-effect transistor (MOSFET) devices. For example, three, four, or more buck/boost converters, which are the same or similar as buck/boost converters 310, 320, may be coupled together in cascaded arrangement.

The buck/boost converters 310, 320 include respective semiconductor switching devices 312, 322 coupled in series with respective diode assemblies 314, 324, which include diode devices. The buck/boost converters 310, 320 also include respective inductors 316, 326, each of which has a first end connected between respective semiconductor switching devices 312, 322 and respective diode assemblies 314, 324. The buck/boost converters 310, 320 are coupled in parallel with respective voltage divider legs 311, 321, which are coupled together in series across a bus capacitor 305 via the power bus rails 304, 306. The second ends of the inductors 316, 326 are coupled to different ends of output capacitor 330.

In operation, when the first buck/boost converter 310 is switched or turned on by turning on the first semiconductor switching device 312 and turning off the second semiconductor switching device 322, current 315 (indicated by the dashed lines with arrowheads) flows from the first power bus rail 304, through the first semiconductor switching device 312, through the first inductor 316, through the output capacitor 330, through the second inductor 326, through the second diode assembly 324, and to the connection between the voltage divider legs 311, 321. When the second buck/boost converter 320 is turned on by turning off the first semiconductor switching device 312 and turning on the second semiconductor switching device 322, current 325 (indicated by the solid lines with arrowheads) flows from the connection between the voltage divider legs 311, 321, through the first diode assembly 314, through the first inductor 316, through the output capacitor 330, through the second inductor 326, through the second semiconductor switching device 322, and to the second power bus rail 306.

Figure 3B:
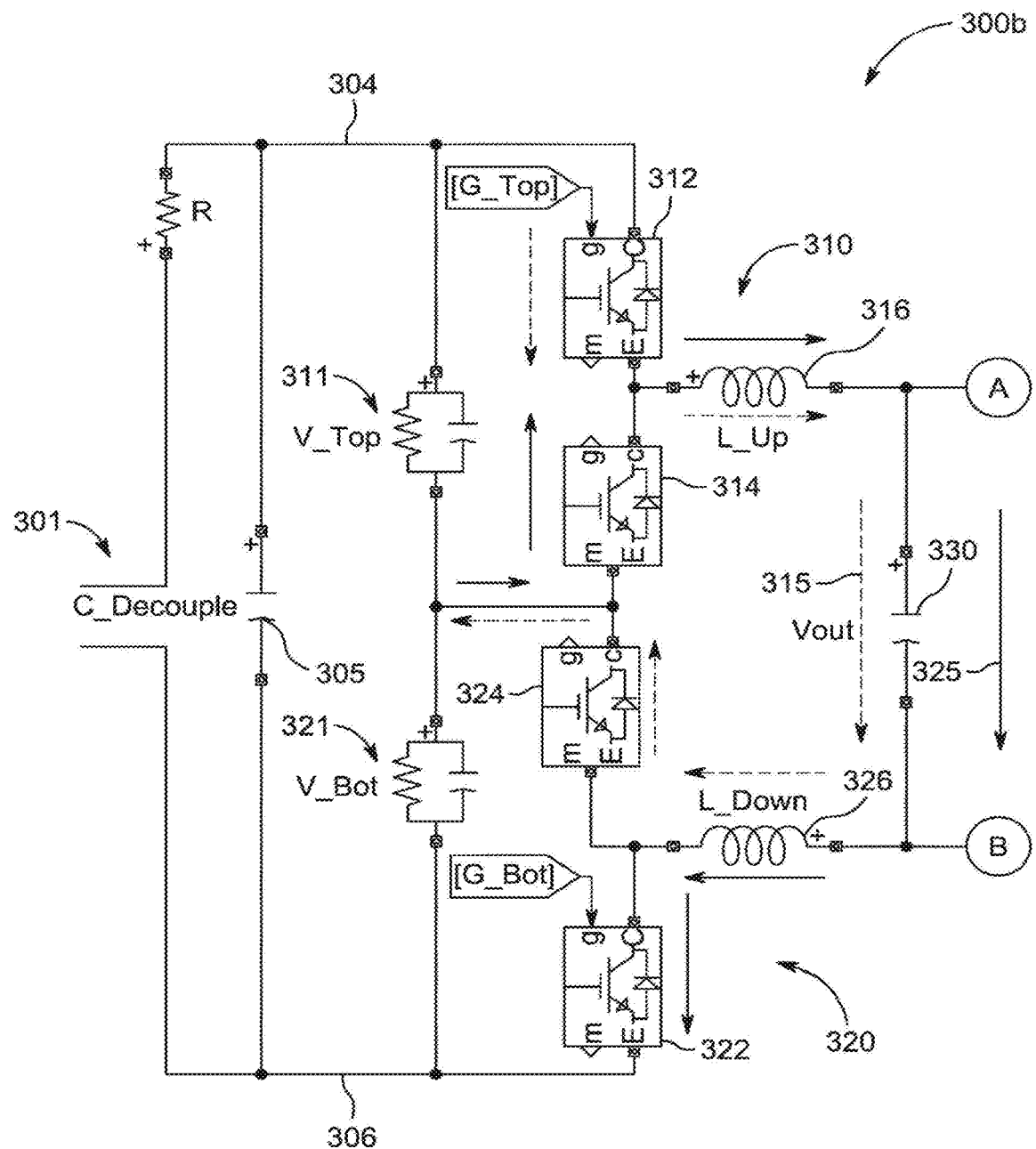
FIG. 3B depicts a circuit diagram of a bidirectional power converter topology operating in a first direction in accordance with another aspect of the disclosure.
Figure 3C:
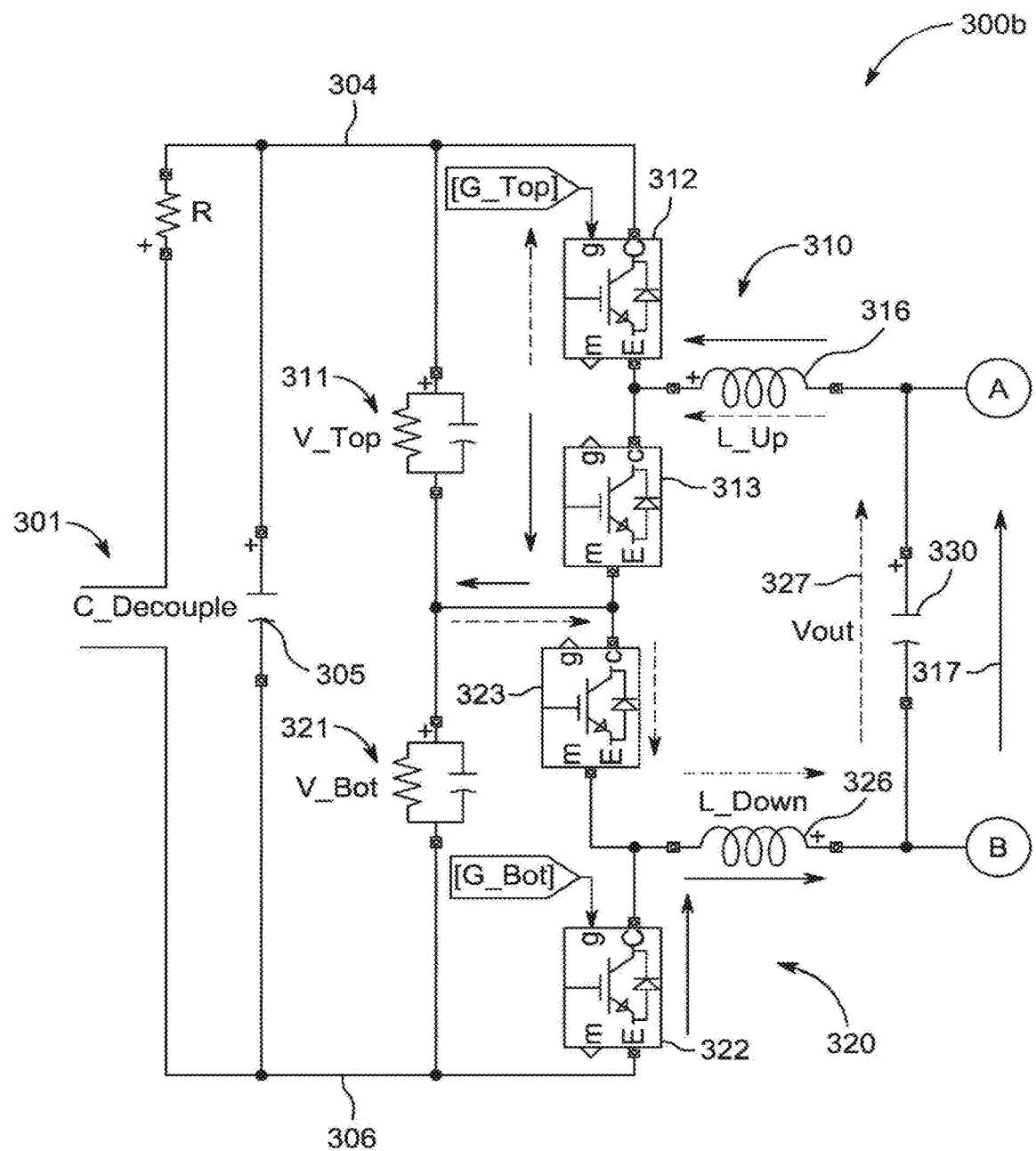
FIG. 3C depicts a circuit diagram of the bidirectional power converter topology of FIG. 3B operating in a second direction in accordance with another aspect of the disclosure.

In an alternative aspect illustrated in FIGS. 3B and 3C, the diode assemblies 314, 324 may be replaced by semiconductor switching devices that are the same as or similar to semiconductor switching devices 312, 322 to form a bidirectional power converter. The first end 301 of the bidirectional power converter subassembly 300b may couple to both a PV string, e.g., the PV string 302 illustrated in 3A, and a utility power grid. In this configuration, the bidirectional power converter subassembly 300b may be operated in a first direction to convert the power generated by the PV string into a form usable by the controller 26 of FIG. 2. The bidirectional power converter subassembly 300b may also be operated in a second direction to convert power supplied from an energy storage device, e.g., the battery 24 of FIG. 2, into a form usable by the utility power grid.

FIG. 3B illustrates a first direction of operation of the bidirectional power converter, which is similar to that described above with respect to FIG. 3A, where the semiconductor switching devices 313, 323 of FIG. 3B are turned off and the diodes of the semiconductor switching devices 313, 323 operate in the same or similar manner as the diode assemblies 314, 324 of FIG. 3A.

FIG. 3C illustrates a second direction of operation of the bidirectional power converter. When the first buck/boost converter 310 is turned on by turning on semiconductor switching device 313, current 317 (indicated by the solid lines with arrowheads) flows from the second power bus rail 306, through the diode of the second semiconductor switching device 322, which may be turned off, through the second inductor 326, through the output capacitor 330, through the first inductor 316, through the semiconductor switching device 313, and to the connection between the voltage divider legs 311, 321. When the second buck/boost converter 320 is switched or turned on, current 325 (indicated by the dashed lines with arrowheads) flows from the connection between the voltage divider legs 311, 321, through the first diode assembly 314, through the first inductor 316, through the output capacitor 330, through the second inductor 326, through the second semiconductor switching device 322, and to the second power bus rail 306.

Figure 3D:
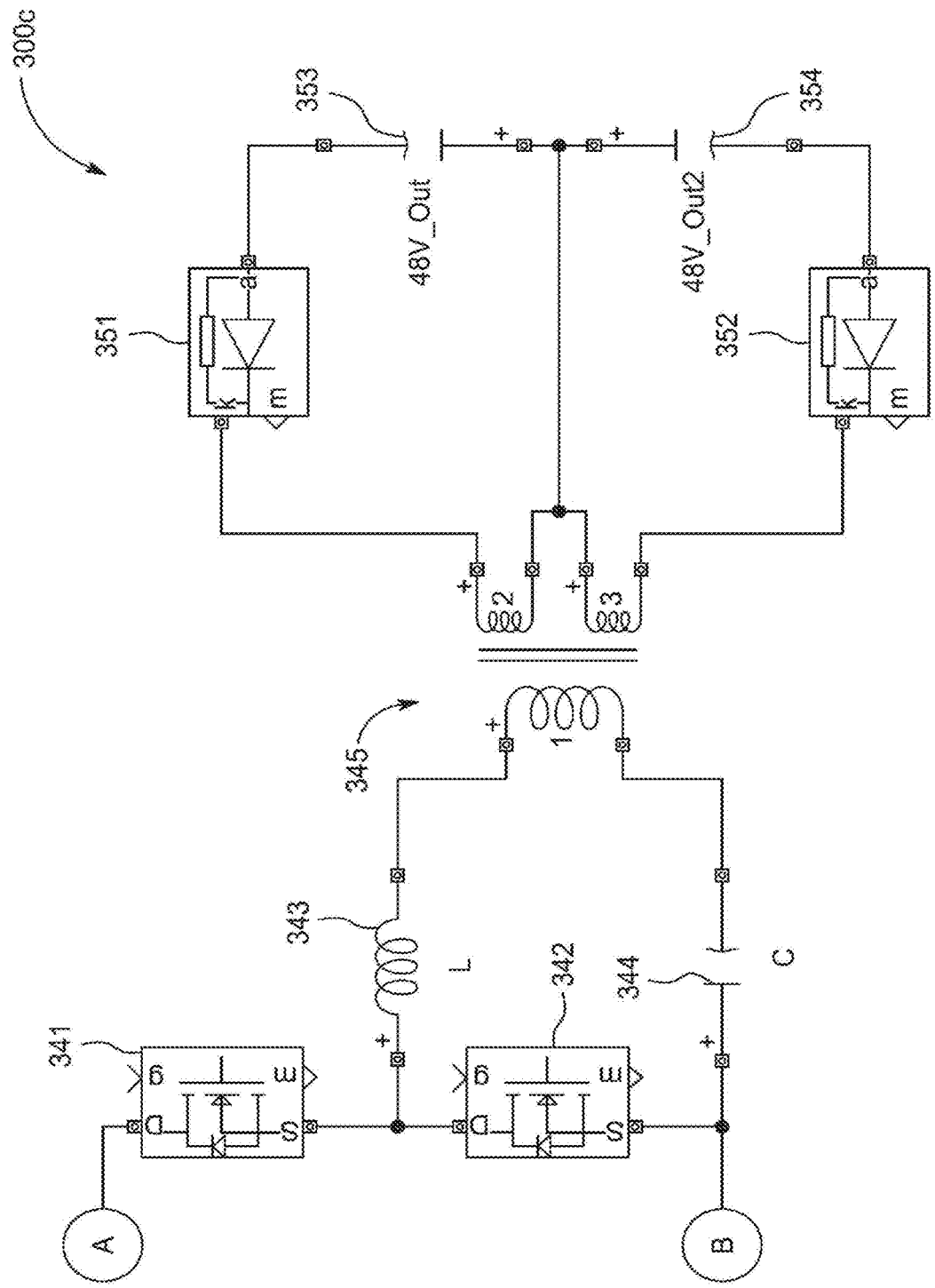
FIG. 3D depicts a circuit diagram of an additional portion of a power converter topology in accordance with aspects of the disclosure.

FIG. 3D illustrates a power converter subassembly 300c, which may connect, at points A and B, to the unidirectional power converter subassembly 300a of FIG. 3A or the bidirectional power converter subassembly 300b of FIGS. 3B and 3C. The power converter subassembly 300c includes transistors 341, 342 coupled together in series across points A and B. The transistors 341, 342 may be MOSFETs. The power converter subassembly 300c also includes a dual voltage transformer 345 having a primary winding and dual secondary windings connected together in series to form a center-tapped transformer having a center tap between the dual secondary windings. The first end of the primary winding connects between the transistors 341, 342 via an inductor 343 and the second end of the primary winding connects to point B via a capacitor 344.

The power converter subassembly 300c also includes diode assemblies 351, 352, which connect to different ends of the series-connected secondary windings of the dual voltage transformer 345. The diode assemblies 351, 352 are connected in series with respective capacitors 353, 354, which connect to each other and to the center tap of the dual voltage transformer 345. The dual voltage transformer 345 is used to step down the voltage output from the unidirectional power converter subassembly 300a or the bidirectional power converter subassembly 300b to a level that is usable by the solar tracker system 10, e.g., 48 V, and to electrically isolate the tracker system electronics from the solar panel or PV string.

Figure 4:
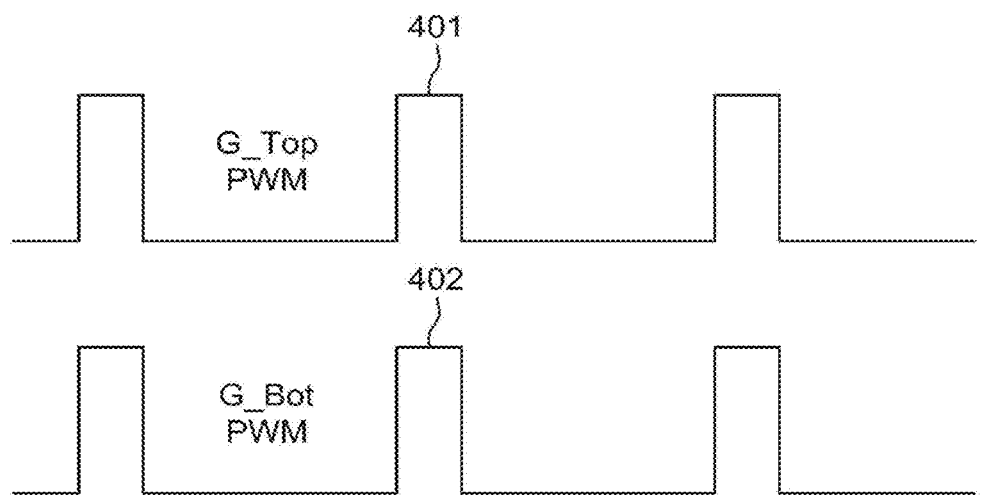
FIGS. 4 and 5 depict waveform diagrams of drive or switching signals for switching the semiconductor switches of power converters in accordance with the disclosure.

FIG. 4 depicts drive or switching signals 401, 402 for switching the semiconductor switching devices 312, 322 of FIGS. 3A-3C and the semiconductor switching devices 313, 323 of FIGS. 3B and 3C. The switching signals 401, 402 are in phase with each other so that the semiconductor switches or switching devices 312, 322 or the semiconductor switches or switching devices 313, 323 turn on and off at the same time. According to this switching algorithm, the effective frequency at the inductors 316, 326 is the highest switching frequency of the semiconductor switching devices 312, 322 or the semiconductor switching devices 313, 323. The switching signals 401, 402 may be pulse width modulation (PWM) signals.

Figure 5:
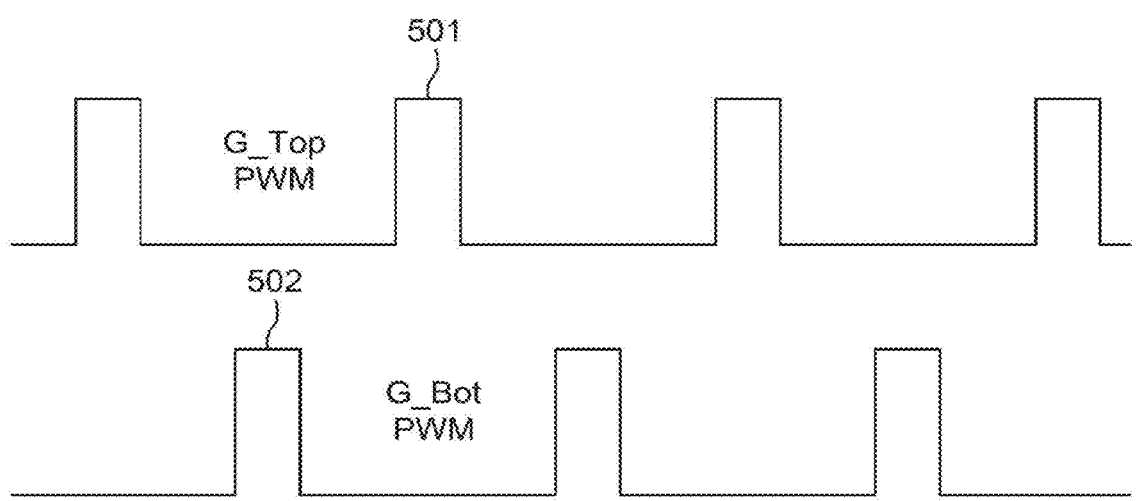

FIG. 5 depicts drive or switching signals 501, 502 for switching the semiconductor switching devices 312, 322 of FIGS. 3A-3C and the semiconductor switching devices 313, 323 of FIGS. 3B and 3C. The switching signals 501, 502 are 180 degrees out of phase from each other. As a result of the interleaved switching signals 501, 502, the effective frequency at the inductors 316, 326 is twice the highest switching frequency of the semiconductor switching devices 312, 313, 322, 323. This decreases the size and cost of the inductors 316, 326.

In other implementations, the switching signals 501, 520 may be interleaved, but may not be 180 degrees out of phase from each other. In implementations where there are more than two buck/boost converters in a cascaded configuration, the switching signals for switching the semiconductor switching devices may be interleaved. For example, for a power converter topology in which there are three buck/boost converters in a cascaded configuration, the switching signals may be 120 degrees out of phase from each other.

Figure 6:
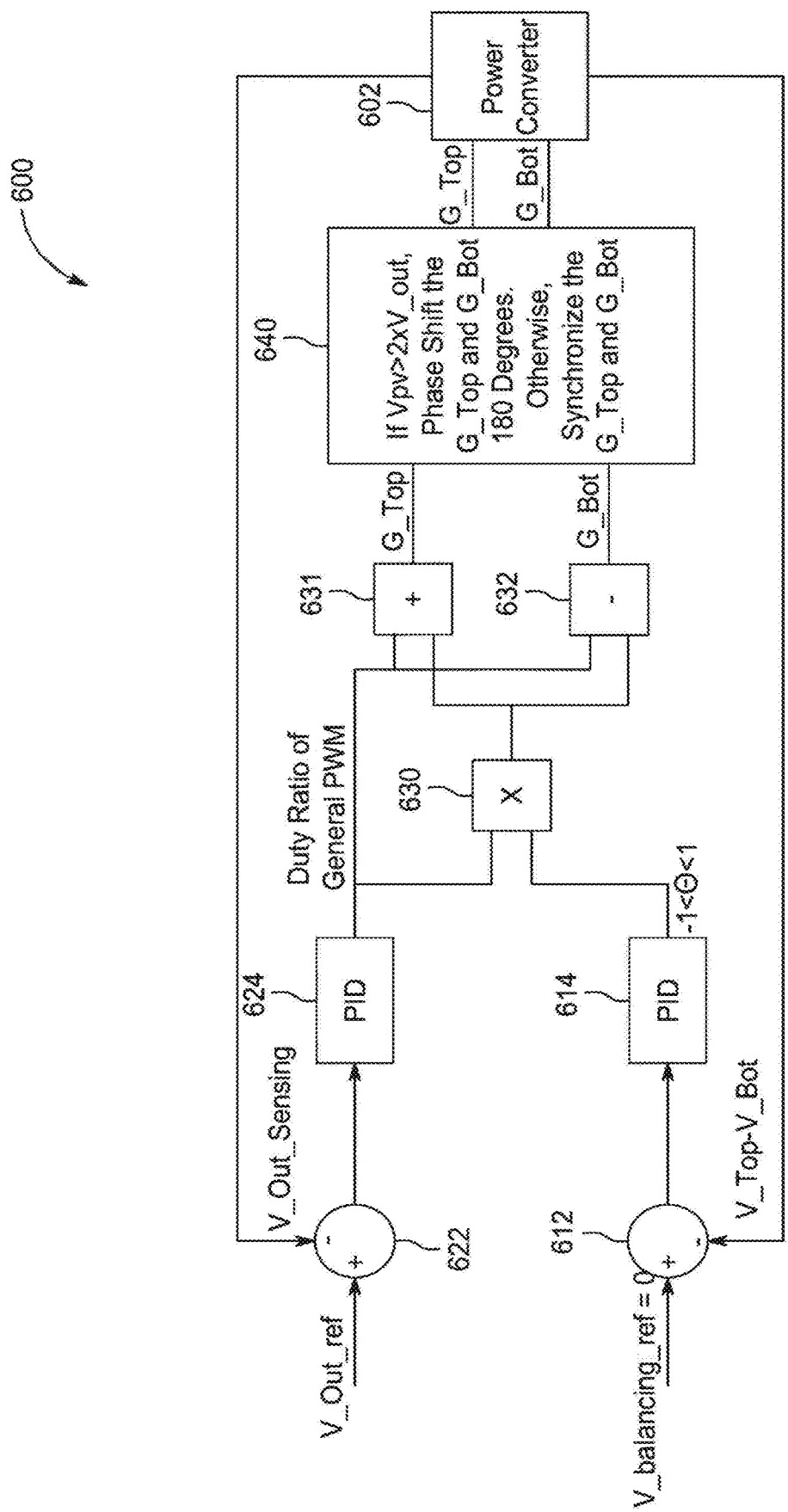
FIG. 6 depicts a logic block diagram of a control system used for driving the semiconductor switches of a power converter in accordance with an aspect of the disclosure.

FIG. 6 depicts a logic block diagram of a control system 600 used for driving the semiconductor switches of a power converter in accordance with an aspect of the disclosure. The control system 600 includes a power converter 602, which includes voltage sensors (not shown) for sensing the output voltage of the power converter 602 and the difference between the voltages of the top and bottom bus rails. The difference between the voltages of the top and bottom bus rails is subtracted from a balancing reference voltage (e.g., 0 V) by a subtractor 612. The output from the subtractor 612 is provided to a PID controller 614. The sensed output voltage is subtracted from a reference output voltage by a subtractor 622. The output from the subtractor 622 is provided to a PID controller 624.

The output of the PID controller 624, which is the duty ratio of a general PWM signal, is multiplied by the output of the PID controller 614, which ranges between −1 and 1, by the multiplier 630. The output of the multiplier 630 and the output of the PID controller 624 are provided to an addition block 631 and a subtraction block 632. The outputs from the blocks 631, 632 are the gate drive signals for top and bottom semiconductor switches, respectively, of the power converter 602. In operation, the control system 600 separately varies the duty ratios of the top and bottom gate drive signals based on the difference between the voltages of the top and bottom bus rails to balance the voltages of the top and bottom bus rails.

Logic block 640 determines whether the voltage of a photovoltage string to which the power converter 602 is attached is greater than twice the output voltage of the power converter 602. If the voltage of the photovoltage string to which the power converter 602 is attached is greater than twice the output voltage of the power converter 602, the phases of the gate drive signals are separated by 180 degrees; otherwise, the phases of the gate drive signals are synchronized. The gate drive signals output from the logic block 640 are then used to drive respective semiconductor switches in the power converter 602.

Figure 7:
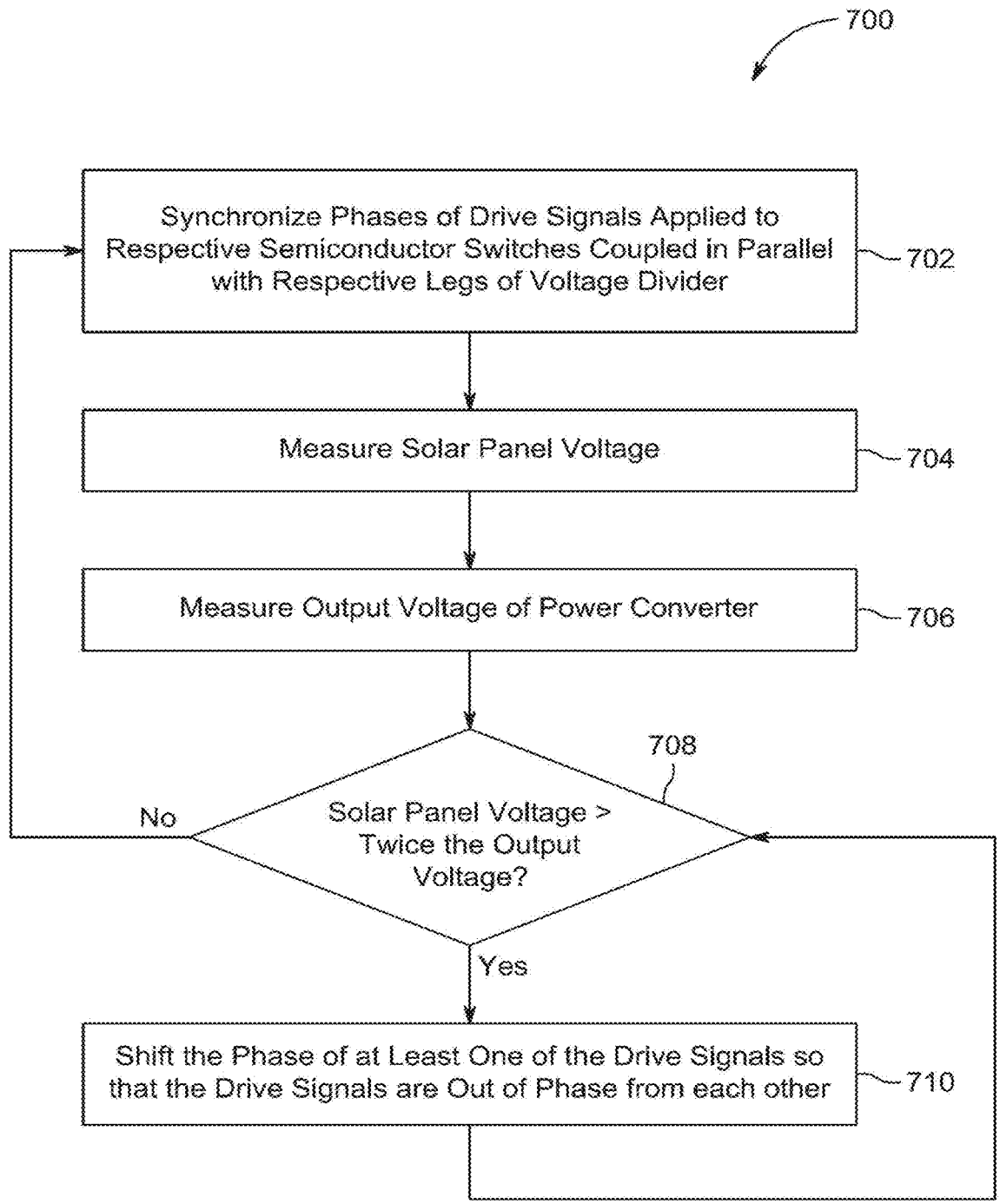
FIG. 7 depicts a flow diagram for a control algorithm used for driving the semiconductor switches of a power converter in accordance with an aspect of the disclosure

FIG. 7 depicts a flow diagram for a control algorithm 700 used for driving the semiconductor switches of a power converter in accordance with an aspect of the disclosure. At block 702, the phases of the drive signals applied to respective semiconductor switches coupled in parallel with respective legs of a voltage divider are synchronized. At block 704, the voltage of a solar panel or a photovoltaic string is measured and, at block 706, the output voltage of the power converter e.g., the voltage at the output capacitor 330 of FIG. 3A is measured. At block 708, the controller determines whether the solar panel voltage is greater than twice the output voltage. If the measured solar panel voltage is greater than twice the output voltage, the phases of at least one of the drive signals is shifted so that the drive signals are out of phase from each other, at block 710. In some implementations, the phases of both drive signals are shifted so that they are 180 degrees out of phase. In some implementations, the phase of at least one of the drive signals is shifted so that the phase difference between the drive signals is something other than 180 degrees, e.g., 60 or 120 degrees, but the "on" portions of the drive signals are interleaved or do not overlap.

After the phase of at least one of the drive signals is shifted, the process returns to block 708. If the measured solar panel voltage is determined not to be greater than twice the output voltage at block 708, the control algorithm 700 returns to block 702, at which the phases of the drive signals are synchronized.

Many commercially-available capacitors have capacitance tolerances of 3% or more. Thus, there is little chance that the capacitors in the respective legs 311, 321 of the voltage divider of FIG. 3A will be the same. Also, there is little chance that the bleeding resistors coupled in parallel with the respective capacitors will be the same. As a result, the input voltage will not be evenly shared by the capacitors. Without active management of the DC voltages on the power bus rails 304, 306, the voltage of the power bus rail 304 may drift higher and higher or the voltage of the power bus rail 306 may drift lower and lower) to the point where the voltage exceeds the maximum voltage rating of one of the semiconductor switching devices 312, 313, 322, 323, which may cause failure of one of the semiconductor switching devices 312, 313, 322, 323.

To balance the DC voltages on the power bus rails 304, 306, the voltages on the power bus rails 304, 306 are monitored every PWM cycle to determine whether to adjust the drive signals applied to the semiconductor switching devices 312, 313, 322, 323 based on the voltages on the power bus rails 304, 306. Thus, the energy is balanced based on the bus voltage rather than based on passive capacitance or resistance of the legs 311, 321 of the voltage divider.

Figure 8:
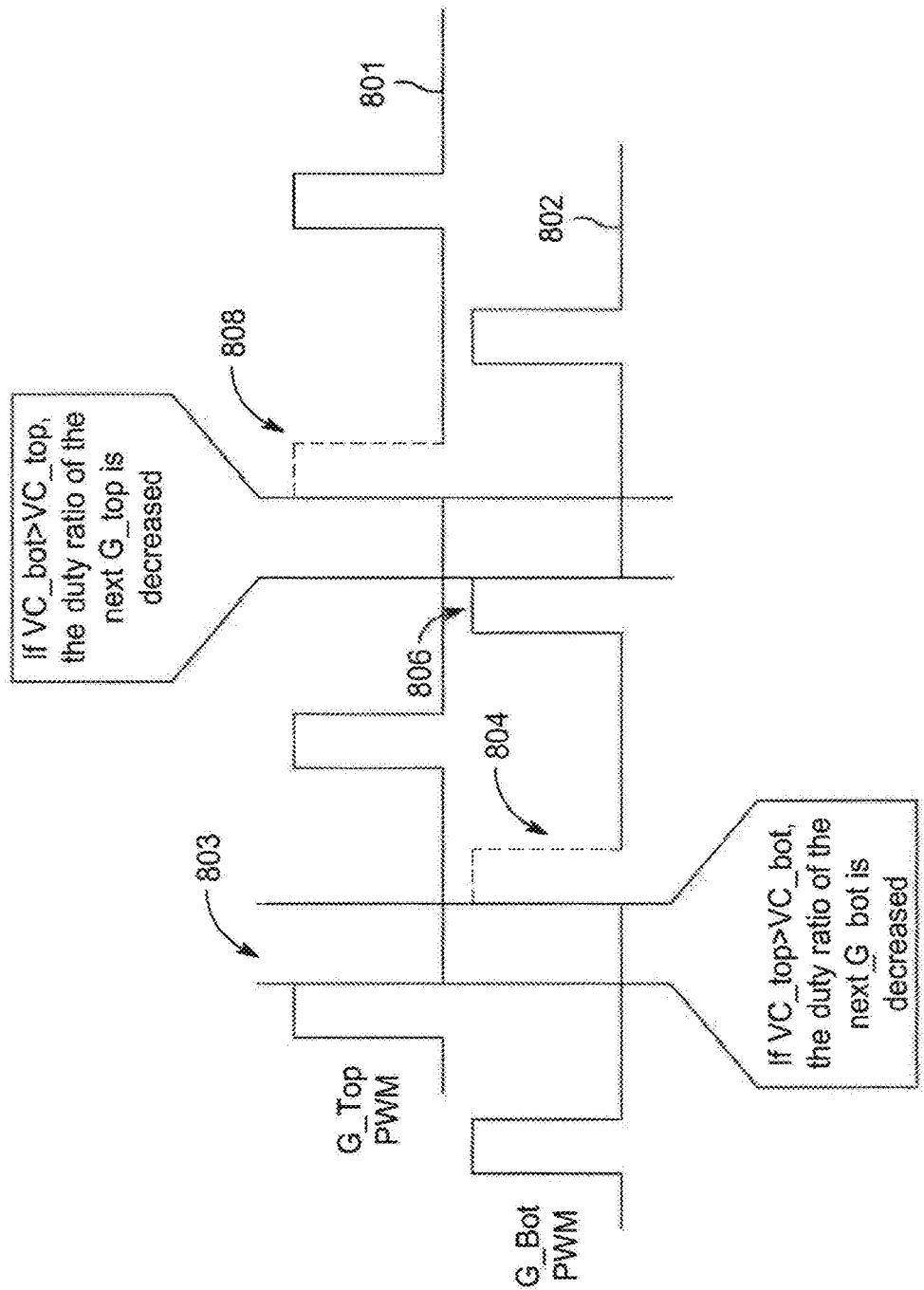
FIG. 8 depicts a waveform diagram illustrating an example method for adjusting the drive signals applied to the respective semiconductor switches of a power converter in accordance with an aspect of the disclosure.

FIG. 8 depicts a waveform diagram illustrating an example method for adjusting the drive signals 801, 802 applied to the respective semiconductor switching devices 312, 322 or the respective semiconductor switches or switching devices 313, 323 based on the voltages on the power bus rails 304, 306. If, at or after pulse 803 of the first drive signal 801, the voltage on the first power bus rail 304 is greater than the voltage on the second power bus rail 306 (i.e., the absolute value of the voltage on the second power bus rail 306), the duty ratio of the next pulse 804 of the second drive signal 802 is decreased. For example, the duty ratio of the next pulse 804 of the second drive signal 802 is decreased to zero. Similarly, if, at or after pulse 806 of the second drive signal 802, the voltage on the second power bus rail 306 (i.e., the absolute value of the voltage on the second power bus rail 306) is greater than the voltage on the first power bus rail 304, the duty ratio of the next pulse 808 of the first drive signal 801 is decreased. For example, the duty ratio of the next pulse 808 of the first drive signal 801 may be decreased to zero.

Figure 9:
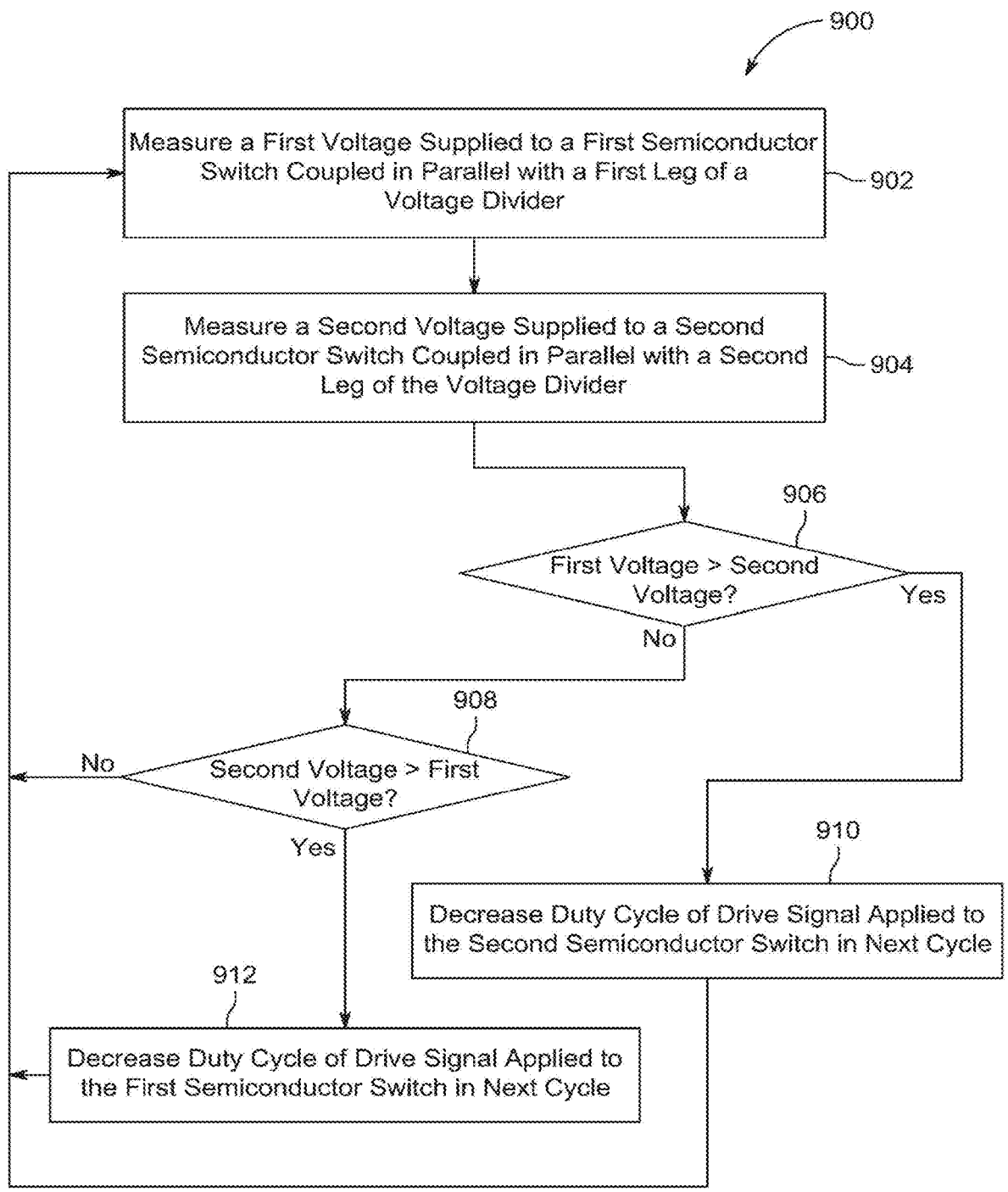
FIG. 9 depicts a flow diagram illustrating a method of operating a medium-voltage power converter that may be performed by a microcontroller unit (MCU) or other type of controller associated with the power converter in accordance with aspects of the disclosure.

FIG. 9 depicts a flow diagram illustrating a method 900 of operating a medium-voltage power converter 50 that may be performed by microcontroller unit (MCU) 51, which resides in the medium-voltage power converter 50. In aspects, the MCU 51 may be implemented in whole or in part by a general-purpose processor, a digital signal processor, an application specific integrated circuit, a field programmable gate array (FPGA) or any other suitable processor. At block 902, a first voltage supplied to a first semiconductor switch coupled in parallel with a first leg of a voltage divider is measured. At block 904, a second voltage supplied to a second semiconductor switch coupled in parallel with a second leg of the voltage divider is measured. Then, at block 906, a controller determines whether the first voltage is greater than the second voltage. If the controller determines that the first voltage is greater than the second voltage, the controller decreases the duty cycle of a second drive signal applied to the second semiconductor switch in the subsequent or next cycle of the second drive signal, at block 910, and the method 900 returns to block 902.

If, at block 906, the controller determines that the first voltage is not greater than the second voltage, the controller determines whether the second voltage is greater than the first voltage, at block 908. If the controller determines that the second voltage is greater than the first voltage, the controller decreases the duty cycle of the first drive signal applied to the first semiconductor switch in the subsequent or next cycle of the first drive signal, at block 912, and the method 900 returns to block 902. If the controller determines that the second voltage is not greater than the first voltage at block 908, the method 900 returns to block 902.

Figure 10:
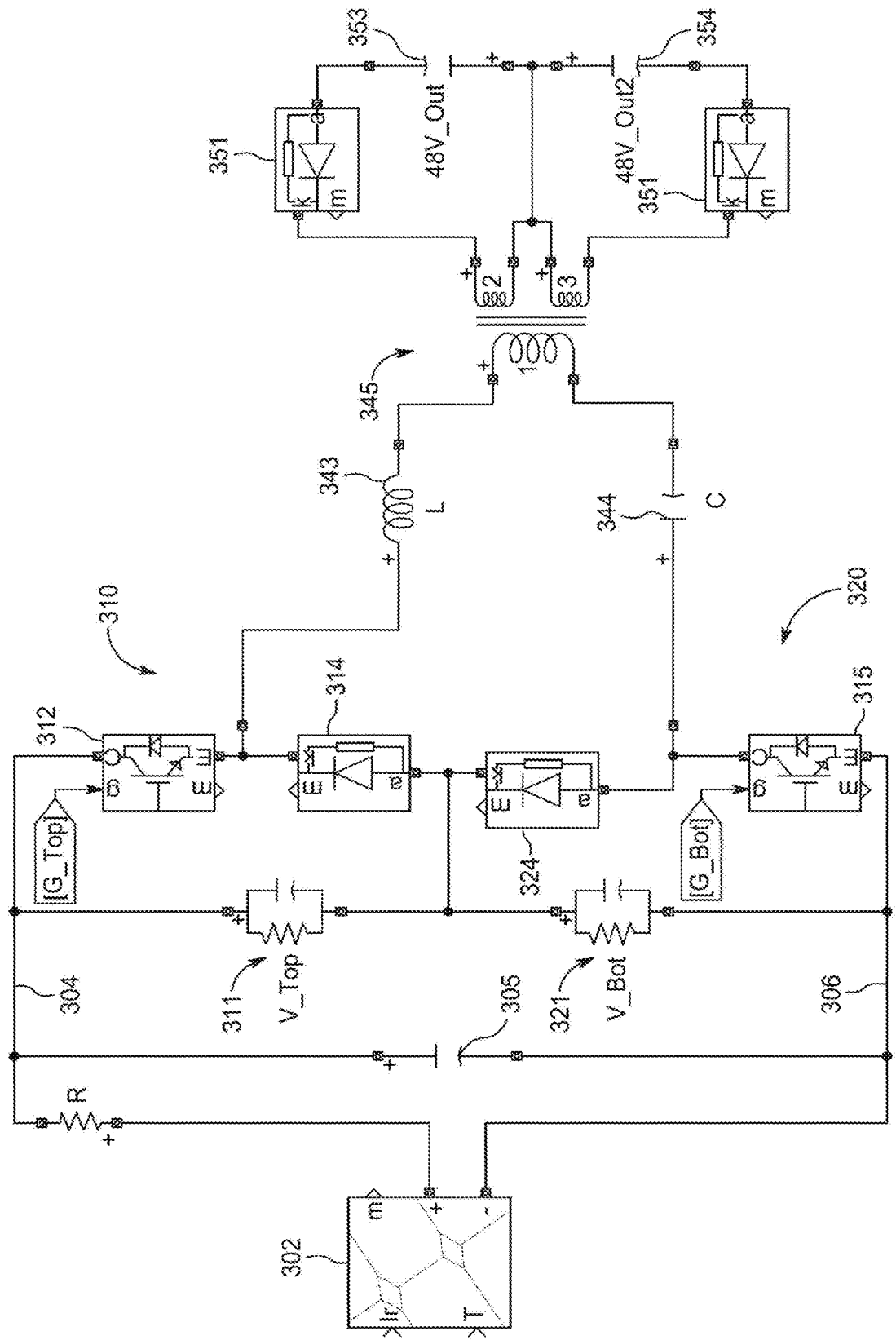
FIG. 10 depicts a circuit diagram of a unidirectional power converter topology in accordance with another aspect of the disclosure.

FIG. 10 depicts a circuit diagram of a unidirectional power converter topology 1000 in accordance with another aspect of the disclosure. The unidirectional power converter topology 1000 includes the power bus rails 304, 306, the bus capacitor 305, the voltage divider legs 311, 321, the buck/boost converters 310, 320, the inductor 343, the capacitor 344, the transformer 345, the diode assemblies 351, 352, and the capacitors 353, 354 of the unidirectional power converter topology of FIGS. 3A and 3D. However, the unidirectional power converter topology 1000 does not include the inductors 316, 326, the output capacitor 330, and the transistors 341, 342 of FIG. 3A. In aspects, the semiconductor switching devices 312, 322 may be operated according to one or more of the methods described in FIGS. 4-9. For example, the out of phase switching pattern or the synchronized switching pattern may be based on the PV input voltage as described herein.

While several aspects of the disclosure have been shown in the drawings, it is not intended that the disclosure be limited thereto, as it is intended that the disclosure be as broad in scope as the art will allow and that the specification be read likewise. Any combination of the above aspects is also envisioned and is within the scope of the appended claims. Therefore, the above description should not be construed as limiting, but merely as exemplifications of particular aspects. Those skilled in the art will envision other modifications within the scope of the claims appended hereto.

The invention claimed is:

1. A power converter for a photovoltaic (PV) string, the power converter comprising:
   a voltage divider having at least two legs, the voltage divider configured to be coupled to the photovoltaic (PV) string;
   a first circuit subassembly including a first semiconductor switch and a third semiconductor switch coupled together in a cascaded configuration, the first circuit subassembly and a first leg of the at least two legs coupled together in parallel;
   a second circuit subassembly including a second semiconductor switch and a fourth semiconductor switch coupled together in a cascaded configuration, the second circuit subassembly and a second leg of the at least two legs coupled together in parallel;
   a first inductor having a first end and a second end, the first end coupled between the first semiconductor switch and the third semiconductor switch, the second end of the first inductor coupled to a first output terminal;

a second inductor having a first end and a second end, the first end coupled between the second semiconductor switch and the fourth semiconductor switch, the second end of the second inductor coupled to a second output terminal; and a controller configured to:
generate a first drive signal for controlling a first voltage supplied to the first and third semiconductor switches;
generate a second drive signal for controlling a second voltage supplied to the second and fourth semiconductor switches; and
adjust one of the first drive signal or the second drive signal to bring the first voltage and the second voltage closer to each other.

2. The power converter of claim 1, wherein each of the at least two legs of the voltage divider include a resistor and a capacitor coupled together in parallel.

3. The power converter of claim 1, wherein the first drive signal is 180 degrees out of phase from the second pulsed signal.

4. The power converter of claim 1, further comprising a third circuit subassembly including a fifth semiconductor switch and a fifth semiconductor device coupled together, the fifth circuit subassembly and a third leg of the at least two legs coupled together in parallel.

5. The power converter of claim 4, wherein the fifth semiconductor device is a diode or a semiconductor switch.

6. The power converter of claim 1, wherein the first, second, third, and fourth semiconductor switches are metal-oxide-semiconductor field-effect transistors (MOSFETs) or insulated-gate bipolar transistors (IGBTs).

7. A method of operating a power converter, the method comprising:
synchronizing phases of drive signals applied to respective semiconductor switches coupled in parallel with respective legs of a voltage divider;
measuring a solar panel voltage;
measuring an output voltage of the power converter;
determining the solar panel voltage is greater than twice the output voltage; and
shifting a phase of at least one of the drive signals so that the drive signals are out of phase from each other.

8. The method of claim 7, wherein shifting the phases of the at least one of the drive signals includes shifting the phases of at least one of the drive signals so that the drive signals are out of phase from each other by 180 degrees.

9. The method of claim 7, wherein the drive signals are pulse-width modulation (PWM) drive signals.

10. A method of operating a power converter, the method comprising:
measuring a first voltage supplied to a first semiconductor switch coupled in parallel with a first leg of a voltage divider;
measuring a second voltage supplied to a second semiconductor switch coupled in parallel with a second leg of the voltage divider;
determining the first voltage is greater than the second voltage;
decreasing a duty cycle of a drive signal applied to the second semiconductor switch in a next cycle;
determining the second voltage is greater than the first voltage; and
decreasing a duty cycle of a drive signal applied to the first semiconductor switch in a next cycle.

11. The method of claim 10, wherein the determining the first voltage is greater than the second voltage includes determining the first voltage is greater than the second voltage plus a predetermined voltage; and wherein
the determining the second voltage is greater than the first voltage includes determining the second voltage is greater than the first voltage plus the predetermined voltage.

12. The method of claim 10, wherein decreasing the duty cycle of a drive signal includes decreasing the duty cycle of a drive signal to zero in a next cycle.

13. The method of claim 10, further comprising generating a drive signal applied to the first semiconductor switch and a drive signal applied to the second semiconductor switch so that the drive signals are out of phase from each other.

14. The method of claim 13, wherein the drive signals are 180 degrees out of phase from each other.

15. The method of claim 10, wherein the drive signal is a pulse-width modulation (PWM) drive signal.

16. The method of claim 10, wherein the duty cycle of the drive signal is decreased by a predetermined amount that brings the first voltage and the second voltage closer to each other.

* * * * *